United States Patent [19]

Silva et al.

[11] 4,277,761

[45] Jul. 7, 1981

[54] METHOD OF COATING METAL ON A GLASSY BODY SURFACE AND RESULTING ARTICLE

[75] Inventors: Robert M. Silva, Dayton; Fred D. Orazio, Jr., Centerville, both of Ohio

[73] Assignee: VTI, Inc., Dayton, Ohio

[21] Appl. No.: 40,655

[22] Filed: May 21, 1979

[51] Int. Cl.³ .............................. H01S 3/00; B05D 3/14
[52] U.S. Cl. ............................... 331/94.5 T; 206/0.6;
206/0.7; 427/39; 427/107
[58] Field of Search .................... 427/38, 39, 107, 294;
331/94.5 R, 94.5 D, 94.5 T; 206/0.6, 0.7

[56] References Cited

U.S. PATENT DOCUMENTS

| | | | |
|---|---|---|---|
| 2,394,930 | 2/1946 | McRae | 427/39 |
| 2,799,600 | 7/1957 | Scott | 427/38 |
| 3,180,751 | 4/1965 | Law | 427/39 |
| 3,452,503 | 7/1969 | Miller | 206/0.6 |
| 3,516,010 | 6/1970 | Rasch et al. | 331/94.5 T |
| 3,876,957 | 8/1975 | Thatcher | 331/94.5 T |
| 3,887,883 | 6/1975 | Garman | 331/94.5 D |

*Primary Examiner*—John H. Newsome
*Attorney, Agent, or Firm*—Jacox & Meckstroth

[57] ABSTRACT

In glass bodied gas lasers which use helium as a constituent gas, the leakage of helium through the laser walls is controlled by a specially applied external sealed metal coating. The glass body of the laser is then used as a solid state helium reservoir. In addition, in all lasers with thermal problems, such as distortion and the like, this same specially applied metal coating serves to distribute the temperature evenly over the laser minimizing those thermal distortions.

15 Claims, 3 Drawing Figures

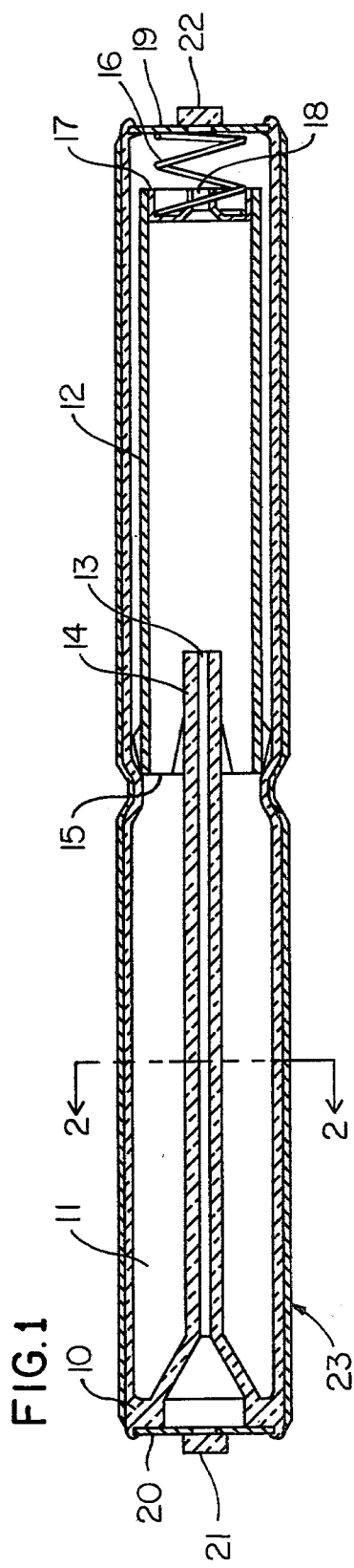
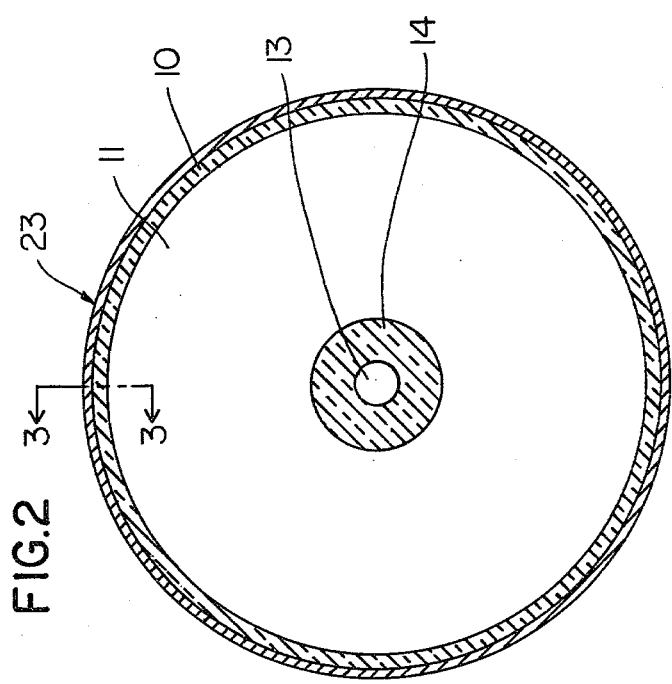
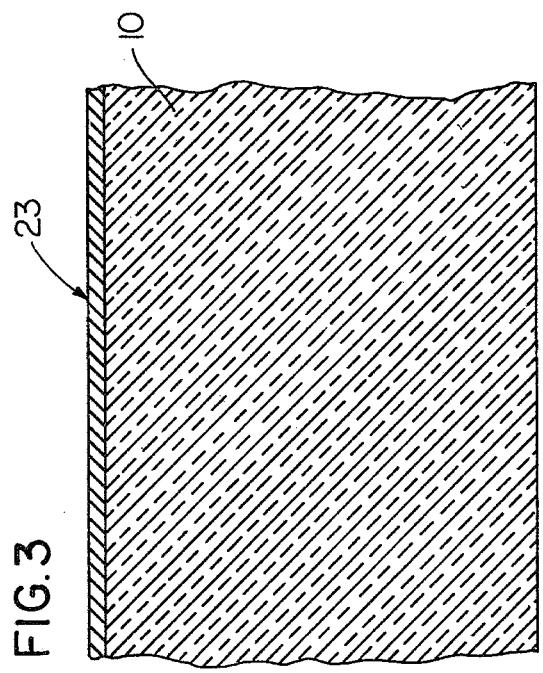

METHOD OF COATING METAL ON A GLASSY BODY SURFACE AND RESULTING ARTICLE

BACKGROUND OF THE INVENTION

All lasers have thermal problems of some sort. In addition, gas lasers, particularly those using helium as one of the gases, suffer from gas leakage through the laser body walls. Some glass, such as fused silica, has characteristics desirable for use in lasers but the leakage problem effectively prevents its use because the loss of helium causes the laser to fail. Glass is also porous to gases other than helium, although to a lesser degree. Particularly troublesome in this regard is water vapor. Water vapor soaks into the structural interstices of the glass, which is a sponge-like on a microscopic level, and is released into the laser as the material heats. This mechanism is responsible for another common laser failure mechanism, oxygen contamination, as the water is broken into its constituents by the laser plasma. All gas lasers use some form of extra oxygen getter, generally a flashed barium compound to try to control this phenomenon, but the results are marginal.

Many gas lasers today use pyrex bodies, metal-to-glass end seals for mirror mounting, and the flashed barium getters for oxygen control. All of these measures slow but a short while the above discussed failure mechanics. If a method or process were found that could ameliorate these problems, gas lasers could be made more rugged, smaller, at a lower price and have a longer life. The economics of such an event would open the use of lasers to many now prohibitively expensive situations as well as to lower the cost of current usage significantly. These two problems with lasers have persisted since their early development, i.e., the leakage of helium through the glass walls of the standard design gas lasers in general use which use helium as one of the gas components; and the control of the thermal environment in nearly all lasers whether or not they use gas as a component.

The struggle with the above two problems has led to engineering solutions which are basically techniques of living with the prime difficulties. These solutions include:

1. larger volume gas reservoirs to provide more gas and achieve longer life,
2. using glass with the lowest available, but finite, helium leak rate,
3. using ceramics and vitreous ceramics for laser bodies,
4. for crude thermal control, wrapping aluminum foil loosely around the laser body. This foil distributes the heat, by conduction, along the length of the laser body thus reducing thermal gradients. The foregoing solutions are inefficient and make no direct approach to the physics of the base problems.

U.S. Pat. Nos. 3,437,950, 3,445,785, 4,007,431 and 4,017,808 all restate with various degrees of emphasis the problem of laser life and thermal control. U.S. Pat. No. 3,437,950 uses a shrink-fitted metal structure over a ceramic laser tube to carry away heat. The phenomenon which allows the shrink-fitted metal sleeve to work is the fact that the shrink-fitted sleeve is in tension. As the laser is heated and the material below expands, this tension is somewhat relaxed thereby keeping the stress on the under material within reasonable limits. The materials then have no great tendency to debond under normal thermal stresses. However, this is true for all metal-over systems where there symmetry in the structure and an under material of significantly lower coefficient of thermal expansion.

U.S. Pat. Nos. 3,445,785 and 3,979,696 both discuss coating of various parts of lasers to achieve greater efficiency. Both deal with optically pumped lasers coated with transparent material which absorbs off-axis radiation which can depump the laser. They point out that the well-known sputtering technique of coating is quite useful for depositing desirable layers onto solid state lasers or into the pumping cavity of an optically pumped device.

U.S. Pat. Nos. 4,007,431 and 4,017,808 both address laser life as a significant and largely unsolved problem. Both address the laser cathode in their search for a solution; one by design, one by coating through anodization.

With regard to helium leakage in lasers, the problem has existed since the development of gas lasers. In 1954, W. A. Rogers, et al, writing in the *Journal of Applied Physics* 25 868-75, studied the problem of helium diffusion through thick walled vessels. They derived an equation under the assumptions of a partial pressure of helium on one side of the vessel wall and none on the other. It should be noted that helium diffusion depends on the character of the material containing it and the partial pressure of helium on each side. The partial pressure of helium in the atmosphere is near zero. Regardless of the pressure of the other gases in the atmosphere, the contained helium thinks that the outside of the vessel is in a vacuum.

In 1961, E. L. Williams published in an Owens-Illinois Technical Center Report titled, "A Literature Review of Diffusion Studies in Glass", data on rates of diffusion of helium through various glasses. In 1970, W. N. Peters and E. K. Stein published in the *British Journal of Physics E: Scientific Instruments* 1970, Volume 3, a paper on work they had done on a NASA contract. That contract, NAS 12-502. was between the NASA Electronics Research Center and the Perkin-Elmer Corporation, Norwalk, Connecticut. The journal paper, "Helium Permeation Compensation Techniques for Long Life Gas Lasers", describes two approaches to the problem of helium containment and prolonging the life of gas lasers for space use. One technique used a double chamber wherein a large volume of helium was contained at high pressure. This helium diffused through glass membranes into the lasing chamber at a rate governed by the thickness of the membranes and the overpressure in the containment chamber. The membranes' thickness kept the helium pressure in the lasing chamber from getting too high. Helium also leaked through the outer walls at a known rate but since these outer walls were thicker and the diffusion slower, the operational life of the laser was extended. No effort was made towards totally containing the helium or using the glass envelope as a helium reservoir.

The second technique in this paper involved coating a basic laser with a glass of lower helium permeability, again using the data from Williams' 1961 report. That glass, RZ-2, is a copper doped glass from Owens-Illinois Inc. It has a thermal expansion coefficient compatible with fused silica and a significantly lower melting point. These latter characteristics are the goal and effect of the copper doping and permitted the material to be put on the outside of the fused silica laser body as a powder and melted in-situ. The RZ-2, upon solidification, would form a less permeable barrier to helium leakage. This paper noted that, according to Williams, the permeability of RZ-2 was nearly four orders of magnitude less than fused silica. They found that even a "relatively thin coating of RZ-2 on all of the exterior surfaces of the fused silica laser body would dramatically reduce permeation."

The conclusion of that paper follows:

"The final design of the space-qualified He-Ne laser utilized both the RZ-2 coating and the two-chamber technique. Analytically, this requires a redefinition of equations (6) and (7) in terms of the permeability of the RZ-2 glass and the fused silica. With the addition of the exterior RZ-2 coating, analysis indicates that operating periods in excess of ten years are feasible, thereby effectively eliminating helium depletion as a cause of failure in fused silica helium-neon lasers."

The solution arrived at in the Peters paper has two major flaws which have mitigated against its adoption since it was generated.

1. The solution is uneconomic, and
2. The solution is partial in application. As stated in the Peters paper, helium permeation was "reduced". However, in order to achieve this reduction, which was never quantitized, it was necessary to use double walled chambers with walls of controlled known thickness. Producing single glass chambers with controlled wall thickness is not difficult. But, double walls, at least in the design configuration of the Peters paper, are difficult and expensive and do not lend themselves well to known production techniques. No application of the Peters solution has been found, and the glass envelope was not used as a helium reservoir.

In the March, 1978, issue of *Laser Focus* magazine, an ad appears on page 70 as follows:

"Hellium-neon lasers are supplied with mirrors mounted by a hard seal rather than epoxy, according to Hughes Aircraft Company's Industrial Products Division. Met-L-Glas seals employ solder glass, controlled surface interfaces and selected materials to create a structural vacuum seal between the laser mirror and the discharge chamber. Because the hard seals are impervious to water, they increase shelf life of the laser tubes to the time required for the helium to diffuse through the glass. Hard seals are standard on Hughes' He-Ne lasers priced at about $200 to $1100, delivery is from stock." Thus, up to the present time, the problem of life in helium gas lasers remains unsolved. The industry is, at the moment, using pyrex glass for laser bodies in a large reservoir design configuration. Although its thermal characteristics are not optimum, it allows less diffusion than fused silica and is cheaper. Using these current solutions, a low priced ($100–$125) laboratory laser will last about one year.

In addition to the life limiting leakage of helium, there is a thermal problem existing with all lasers. In gas lasers, the plasma generates heat which must be distributed and dissipated. The materials normally used in laser construction generally have a low coefficient of thermal conductivity and the laser body designs are long and slender. Both of these characteristics contribute to large thermal gradients and hot spots which result in optical misalignments and changes in the optical characteristics of the laser output beam. One solution to the problem currently used is to wrap the lasers in aluminum foil. Although this method is adequate for some operations, it is inefficient because intimate contact does not exist between the foil and the laser body.

SUMMARY OF THE INVENTION

The present invention described is directed to an improved method for adhering a metal coating to a glass material by a totally chemically bond and by which the operational characteristics of lasers, particularly gas lasers containing helium, can be improved. In accordance with the invention, the outside of the laser's glass envelope, except over the electrodes and mirrors, is coated with copper or some other metal. If the laser uses helium in its active medium, then the glass envelope is made into a helium reservoir by forcing the helium, under pressure, into the glass envelope after coating the envelope with copper. Two basic problems are solved by this approach. First, for lasers containing helium, the copper coating will prevent helium from rapidly leaking away and extinguishing the laser prematurely. Secondly, for many kinds of lasers, it will help to control and reduce thermal gradients which can cause distortions in the laser's optical path.

While the envelope may be coated with any metal, the invention uses a vacuum sputtered coating of commercially pure copper, a plentiful, inexpensive and easy to handle substance. The technique is called "Planar Magnetron Sputtering" and is now capable of depositing 50,000 Å/min of copper. The equipment to perform vacuum sputtering is available from several manufacturers. Other metals, such as gold, silver, nickle and various alloys will also work. However, the metal with the best economics is copper. Great care must be taken with the preparation of the materials and in following the deposition procedures which are described later.

Other features and advantages of the invention will be apparent from the following description, the accompanying drawing and the appended claims.

BRIEF DESCRIPTION OF THE DRAWING

FIG. 1 is an axial section of a typical helium-neon gas laser;

FIG. 2 is an enlarged radial section taken along the line 2—2 of FIG. 1; and

FIG. 3 is a greatly enlarged section of the glass wall of the laser vessel taken along the line 3—3 of FIG. 2 and showing the metal coating of the invention on the outside surface of the glass vessel.

DESCRIPTION OF THE PREFERRED EMBODIMENT

FIG. 1 shows a typical helium containing gas laser having a body 10 made of a glassy material such as fused quartz, fused silica, pyrex or other like material. The body 10 defines a gas reservoir 11 which contains a supply of the lasing gasses sufficient for the operation of the laser. A cathode 12, usually made of aluminum, provides the electrons which flow through a lasing chamber 13 defined by a millimeter sized hole in a tube 14 formed as part of the glass body 10.

The cathode 12 is held in place by spring metal end mounts 15 and 16. The spring 16 presses against an end plate 17 which contains a center hole 18 for the passage of laser light. The other end of the spring 16 contacts the metal electrode 19, and the cathode 12 and electrode 19 are connected to a power supply. An anode electrode 20 is connected to another part of the power supply, and the circuit is completed through the gas of the laser. When power is supplied, electrons flow between the electrodes 19 and 20 through the glass tube 14 exciting the gas and releasing photons which build in intensity in the resonant cavity of the laser between a set of end mirrors 21 and 22.

In accordance with the present invention, a metal coating 23 covers as much of the glass body 10 of the laser as possible without shorting the electrodes 19 and 20 or covering the end mirrors 21 and 22. As shown in FIG. 2, the metal coating 23 of the invention completely surrounds the glass body 10 of the laser. FIG. 3 shows the relative scale of the metal coating 23 in contact with the glass body 10 of the laser, which prevents helium leakage and conducts heat.

As mentioned above, the present invention provides for adhering a metal or copper coating to glassy materials by a total chemical bond. While there have been attempts to coat, adherently, copper onto glass, the attempts have met with little success. For example, a copper coating was attempted by one company at great expense and abandoned because of failure of the coating to adhere. Architectural glass was the primary interest.

Since copper forms an oxide readily, it is quite important that the glass surface of the body 10 be properly prepared for deposition. Although it is possible to coat polished surfaces and get good adherence, it is easier to use surfaces with an 095 or greater grind finish. That is, the process is thus more forgiving of surface contamination.

Since adsorbed and absorbed water is the major contaminant, after the surfaces are degreased, the glass surface is cleaned with alcohol or other water absorbing substances. The compound "collodion" is an excellent surface dehydrating agent. The part is then placed in the vacuum chamber for coating in a three-step operation. The vacuum chamber is configured with a preheater and glow discharge pretreater for further preparing the surface during pumpdown and degassing. Several techniques can be used and anyone skilled in the art can develop their own. For example, the operating pressure of the chamber may be pumped down while heating with a simple 40 watt filament in close proximity. This is followed by an ion scrubbing of the surface by glow discharge bombardment in air which adds excess oxygen ions to the glass surface in order to form the chemical bond.

The first precoating cleaning operation is effective to rid the surface of contaminants and the subsurface of water prior to coating. Water is a severe contaminant, and in the vacuum chamber, water close to the surface moves outward and is dissociated during deposition of the copper. The dissociation yields oxygen atoms which oxidize a large portion of the incoming copper atoms forming a nonadherent layer next to the surface of the glass. Thus water vapor must be eliminated.

Following decontamination and oxygen scrubbing, the part is coated by planar megnetron sputtering. Calculations and tests show that an optimum thickness for heat transfer is on the order of 10 micrometers or greater, assuming coating takes place all over the part. For helium penetration protection only, the coating need be only thick enough to minimize the pores. Since the coating is homogeneous without visible (under an SEM) crystalline structure for low deposition rates, a nearly continuous cover is achieved with as little as a 4 micrometers layer.

Nearly any thickness of the metal coating shows some porosity to helium. With a coating of 25 micrometers, tests have shown a reduction of the helium outflow at one third the uncoated value. In order to insure that the coating is 100% impervious to helium, a post coating treatment is necessary. In some cases it may be possible to select a deposition rate of about 1 micrometer per minute in the early stages and achieve a 100% helium dense coat. Generally, it is more economical to deposit at the rate of 10 micrometers per minute and post treat with an electron beam in the chamber or a modified "shot peening" outside. A particularly effective method is to use four work stations inside the chamber. The work stations involve (1) Preheating, (2) Glow discharge in $O_2$ or air, (3) Planar megnetron coating, and (4) Line electron beam sealing. At the last station it is easy to mount a glow discharge line electron beam gun to cause incipient surface melting of the copper coat after deposition. If still more insurance is needed, steps 3 and 4 may be repeated with only slight pressure changes needed. However, these steps are important to achieving a perfect bond between the coper and the glass. The invention has particularly value for application in ring laser gyroscopes such as is shown in U.S. Pat. No. 4,007,431. These devices are machined from solid blocks of glassy materials such as ULE TM, Cer-Vit TM and $SlO_2$. $SlO_2$, fused silica or fused quartz is the least expensive and most readily available but it leaks helium badly. ULE is more thermally stable but also leaks helium. Cer-Vit leaks less helium but is expensive and scarce. Hence, for ring laser gyros, the invention could extend the life of gyros made from all of these materials if that life is a function of helium leakage. Further, it would allow the use of the least expensive and most readily available material—a significant economical advantage. Additionally, with all of these materials, the invention would act as a thermally stabilizing blanket, distributing heat evenly around the gyro, destroying hot spots and keeping the critical negative effects of heat on bias stability under control.

The invention provides a further advantage for solving a problem in ring laser gyros, that is, the problem of cavity gas contamination. The prime contaminant in ring laser gyro gasses is water vapor. Water vapor in the gas breaks down under plasma action yielding oxygen which uses up the getter and stops the lasing action. Hydrogen, which in its now ionized form, attacks the internal dielectric corner mirrors destroying their essential properties.

By use of the invention, a helium impermeable coating may be deposited on the outside surface of a ring laser gyro. Prior to applying the coating or during the deposition cycle, as the user chooses, the gyro body is vacuum baked to remove all water vapor and other contaminant gasses. At the point, depending upon the choice of user procedures, the ring laser gyro is subjected to an over-pressure of helium while the body cools. This action drives helium into the glassy body of the gyro, turning that body into a solid state helium reservoir. The helium keeps water vapor and other gasses from soaking into the body and later contaminating the lasing gasses. The helium also keeps the lasing gases in balance by replacing helium which leaks away around the mirrors and at any other small surface exposures. This use of the invention has a double effect on ring laser gyro economics by extending the useful life of these devices through reduction in contaminants and increasing the available helium.

In a typical gas laser using helium, the invention permits the same type of economic gains but it also permits size reductions and life extensions which open new applications of laser devices at lower cost. Currently, lasers such as the one illustrated in the drawing, have large volume gas reservoirs. Using the invention, smaller reservoirs are possible because the helium leak rate is lowered or, alternatively, thicker glass bodies can be used as solid state helium reservoirs. The latter technique yields a more rugged, as well as smaller, laser. Other uses, which all require rugged, low cost, long life lasers, will be found in commercial and industrial products such as alignment lasers for machine tools and point of sale terminals which read information directly from a package using a laser beam. Another application may be used in video disk players where low cost and reliability are of major importance.

While the metal coating method and resulting product herein described constitute a preferred embodiment of the invention, it is to be understood that the invention is not limited to the precise form of method and resulting product, and that changes may be made therein without departing from the scope and spirit of the invention as defined in the appended claims.

The invention having thus been described, the following is claimed:

1. A method of adhering a metal coating to the surface of a body of glassy material adapted to be used as the body for a gas laser, comprising the steps of cleaning the surface to remove contaminents such as dust or grease, placing the body into a vacuum chamber, heating the body to remove water vapor, removing gas from the chamber to reduce the pressure within the chamber below atmospheric pressure, exposing the surface to oxygen ions while the pressure is reduced causing oxygen to adhere to the surface, coating the surface with a metal while the pressure is reduced within the chamber to form a chemical bond between the metal and the body, removing the body with the coated metal surface from the chamber while the body is hot, inserting the body into a second chamber filled with helium to saturate the body with helium, cooling the body while in the second chamber, and increasing the pressure within the second chamber.

2. The assembly comprising a gas laser body of glassy material having an outer surface and defining a lasing chamber, a gas containing helium within said chamber, means for exciting the gas, a coating of copper overlying said outer surface, and said copper coating being chemically bonded to said outer surface by oxygen.

3. The assembly comprising a hollow body of glassy material having a surface and defining a chamber adapted to confine helium, a coating of copper overlying said surface, and said copper coating being chemically bonded to said surface by oxygen.

4. The assembly comprising a gas laser body of glassy material having an outer surface and defining a lasing chamber, a gas containing helium within said chamber, means for exciting the gas, a coating of metal overlying said outer surface, and said metal coating being chemically bonded directly to said outer surface by oxygen.

5. A method as defined in claim 1 wherein the surface is cleaned by applying a dehydrating compound to the surface.

6. A method as defined in claim 1 including the step of refilling the chamber with an oxygen containing gas to a pressure of approximately 0.001 Torr. before the surface is exposed to oxygen ions.

7. A method of adhering a copper coating directly to the surface of a body of glassy material comprising the steps of placing the body into a vacuum chamber, removing gas from the chamber to reduce the pressure within the chamber below atmospheric pressure, heating the body while the pressure is reduced and for a sufficient time to remove water vapor from the body, exposing the surface to excess oxygen ions while the pressure is reduced and for a sufficient time to produce a molecular layer oxygen adhering to the surface, coating the surface with copper while the pressure is reduced within the chamber to form a positive chemical bond between the copper and the body, cooling the body, and increasing the pressure within the chamber.

8. A method as defined in claim 7 wherein the copper is coated to a thickness of approximately twenty five microns.

9. A method as defined in claim 7 wherein the body is cooled and the pressure is increased within the chamber by introducing a dry nitrogen gas into the chamber.

10. A method as defined in claim 7 wherein the coated copper surface is cooled within the chamber to below 150° C. before the body is removed from the chamber.

11. A method as defined in claim 7 including the step of heating the body within the vacuum chamber to within a range of 150° C. to 450° C. while the pressure in the vacuum chamber is reduced to approximately 0.0001 Torr. for approximately thirty minutes.

12. A method as defined in claim 7 including the step of preparing the surface of the body prior to coating with the copper by grind finishing the surface.

13. A method of adhering a copper coating directly to the surface of a hollow glass laser body adapted to confine a gas containing helium, comprising the steps of cleaning the surface to remove contaminents such as dust or grease, placing the laser body into a vacuum chamber, removing gas from the vacuum chamber to reduce the pressure within the chamber below atmospheric pressure, heating the laser body while the pressure is reduced and for a sufficient time to remove water vapor from the laser body, exposing the surface of the laser body to excess oxygen ions while the pressure is reduced and for a sufficient time to produce a molecular layer of oxygen adhering to the surface, coating the surface with copper while the pressure is reduced within the chamber to form a chemical bond between the copper and the laser body, cooling the laser body, and increasing the pressure within the chamber.

14. A method as defined in claim 13 including the step of reheating the copper coating for remelting a surface portion of the copper coating to seal any pores within the coating.

15. A method as defined in claim 14 wherein the reheating of the surface of the copper coating is obtained by applying a glow discharge generated line electron beam.

* * * * *